April 14, 1964  J. V. HOSTETTER  3,128,802
PORTABLE POWER SAW WITH TILTABLE FACE PLATE
Filed April 5, 1962  4 Sheets-Sheet 1

INVENTOR.
JOHN V. HOSTETTER

BY Walter S. Pawl
ATTORNEY.

INVENTOR.
JOHN V. HOSTETTER
BY Walter S. Pawl
ATTORNEY.

INVENTOR.
JOHN V. HOSTETTER
BY Walter S. Pawl
ATTORNEY.

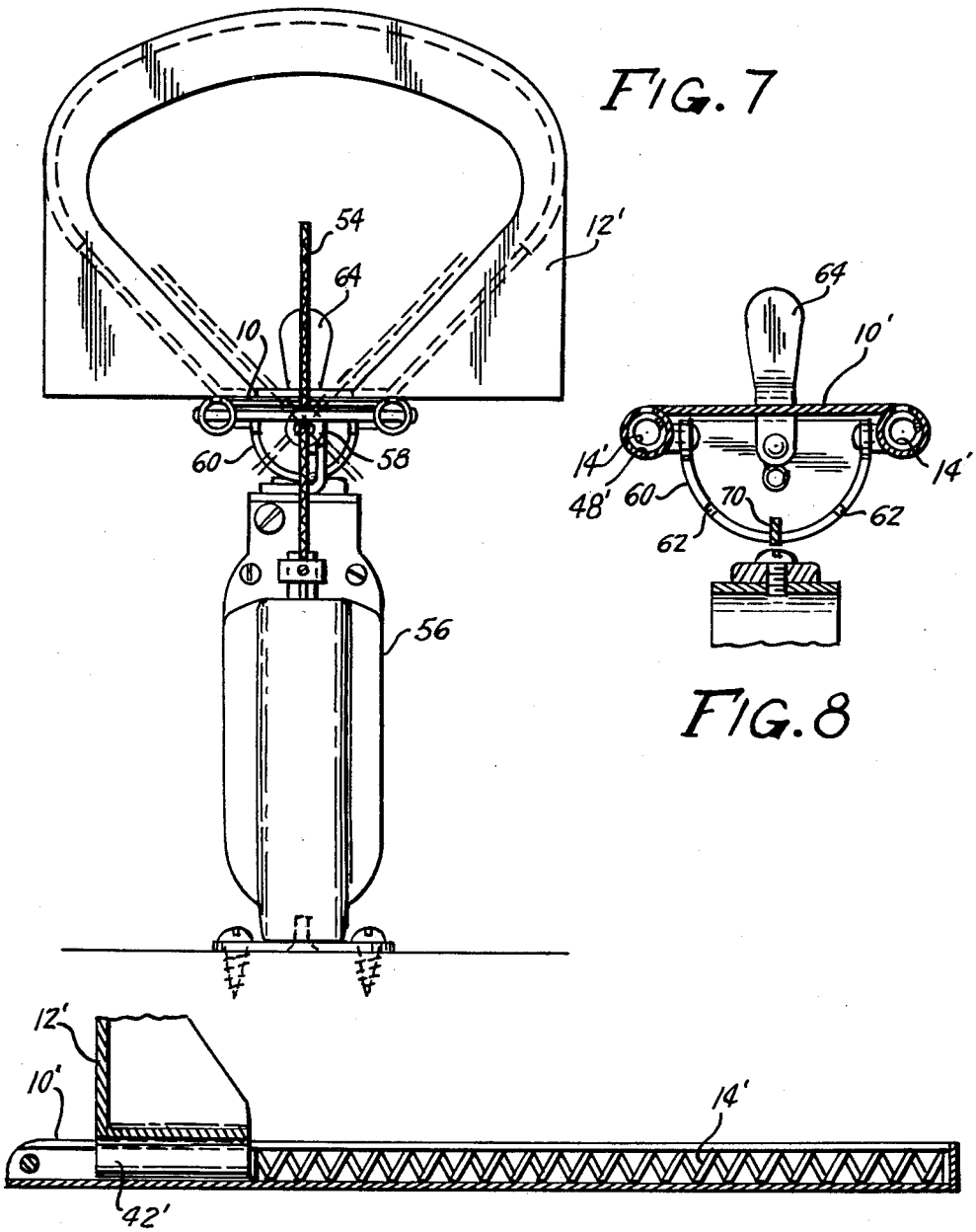

United States Patent Office 3,128,802
Patented Apr. 14, 1964

3,128,802
PORTABLE POWER SAW WITH TILTABLE
FACE PLATE
John V. Hostetter, 5216 Cochran Road, Beltsville, Md.
Filed Apr. 5, 1962, Ser. No. 185,457
9 Claims. (Cl. 143—51)

This invention relates to portable power operated saws having a work guide bracket slidably mounted in a tiltably hinged face plate for making angular or square cuts through work strips.

The object of this invention is to provide a portable power saw with a laterally tiltable face plate and a work guide bracket slidably mounted thereon, and normally biased forward into a position in front of the saw blade, said face plate being hinged in the plane of the saw blade and having means for adjusting its tilt in accordance with the angle of the cut desired.

A further object is to provide a bench mounting bracket on the frame of this saw opposite to said face plate, having screw lugs in a plane parallel to said plate for fastening the saw to the top of a table, for use of the saw as a bench saw.

A further object is to provide lock means for the angular adjustment of the face plate, in any desired angular relation relative to the saw blade.

Figure 1:
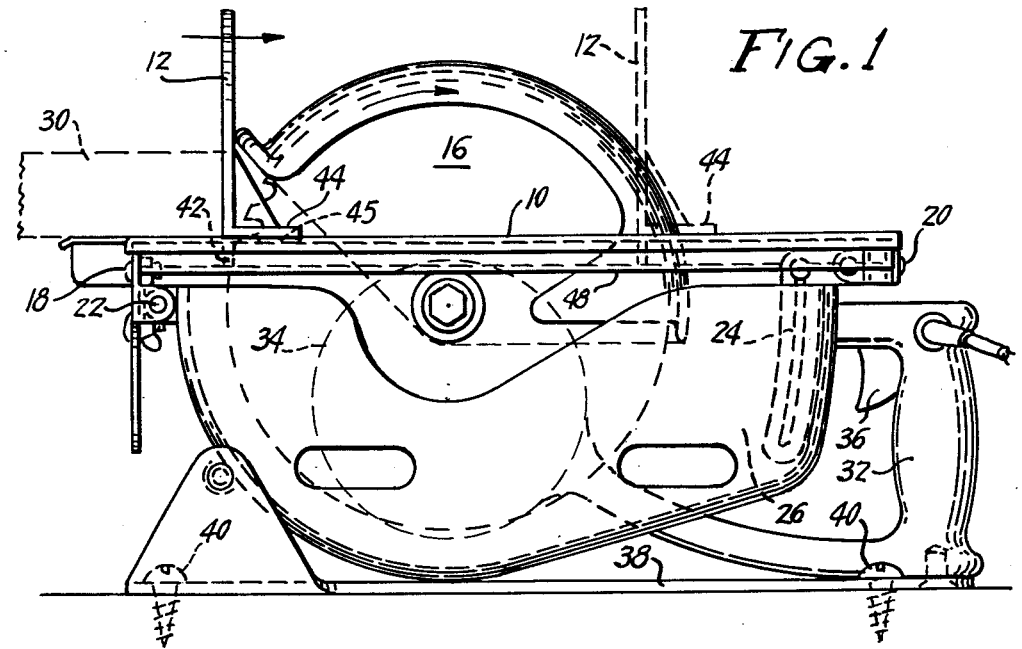
Figure 2:
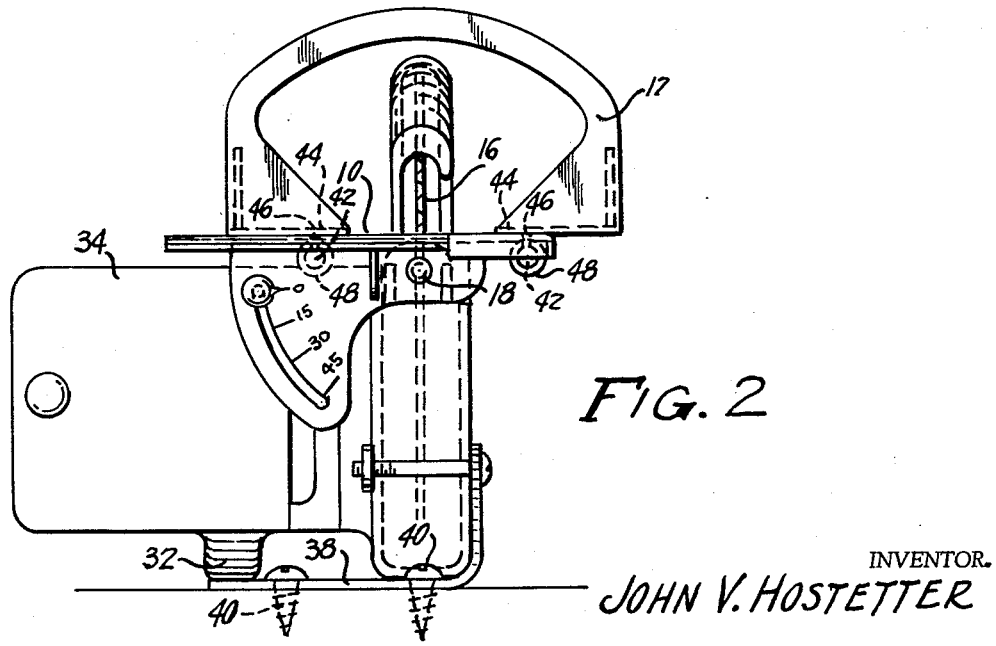
Figure 3:
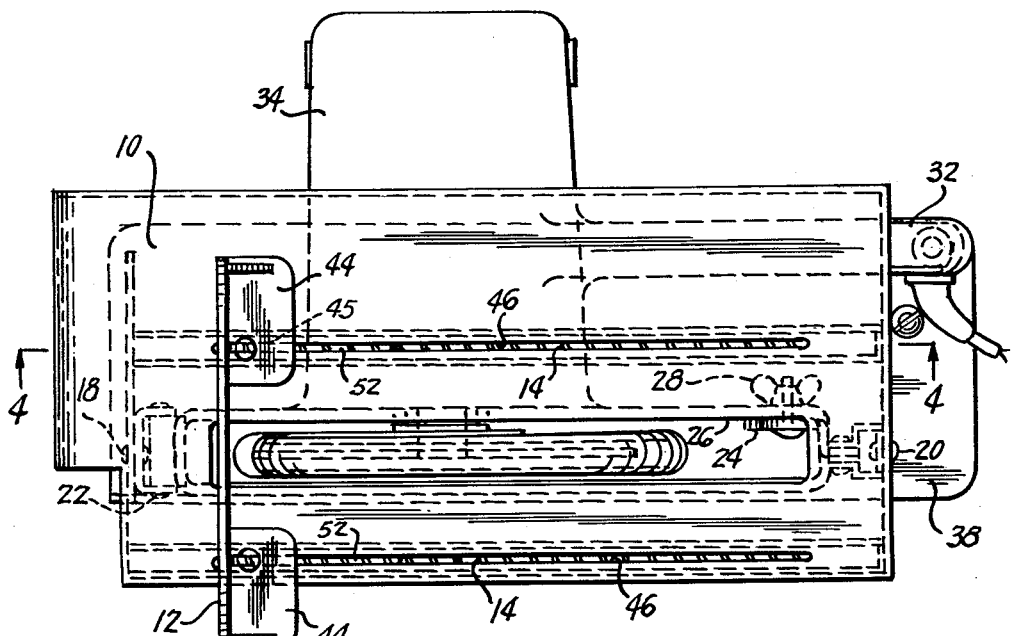
Figure 4:
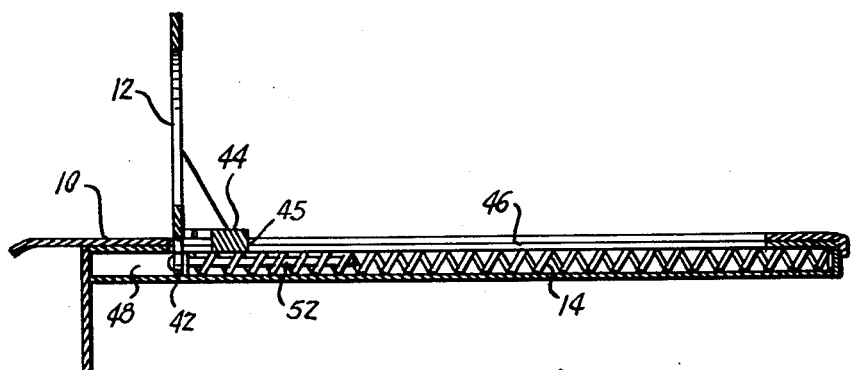
Figure 5:
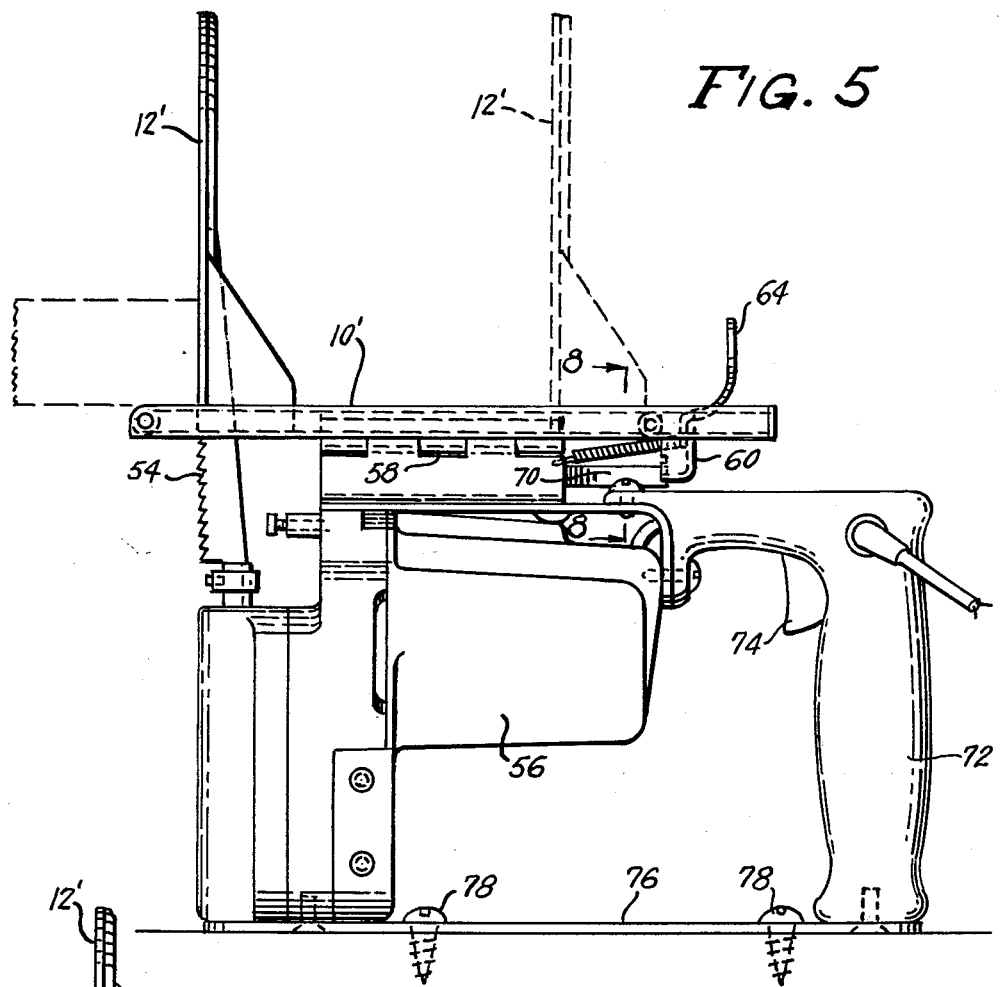
Figure 6:
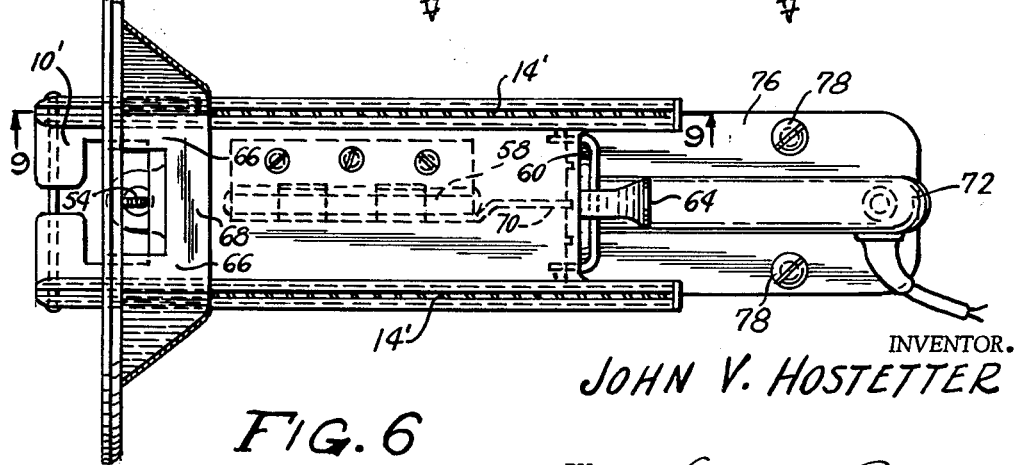

Other and more specific objects will become apparent in the following detailed description of the present invention as applied to a circular saw and a sabre saw, as illustrated in the accompanying drawings, wherein:

FIG. 1 is a side elevational view of a circular saw to which the present invention is applied, and used as a bench saw, FIG. 2 is a front elevational view thereof, FIG. 3 is a plan view thereof, FIG. 4 is a sectional view of a detail taken on the line 4—4 of FIG. 3, FIG. 5 is a side elevational view of a sabre saw to which the invention is applied, and used as a bench saw, FIG. 6 is a plan view thereof, FIG. 7 is a front elevational view thereof, FIG. 8 is an enlarged sectional view of a detail taken on the line 8—8 of FIG. 5, and FIG. 9 is an enlarged sectional view of a detail taken on the line 9—9 of FIG. 6.

A portable power saw provided with an axially hinged face plate 10, as shown, having an axially slidable laterally extending square bracket 12 projecting therefrom on both sides of the saw blade, was found to be a very handy tool by carpenters employed in building construction, because it could be used to cut framework pieces as they are fitted together on the job, without requiring them to be taken to a bench saw, which may be at some distance from the place where they have to be fitted and put together. The square bracket 10 has its base portions extending on both sides of the saw blade connected by an arched portion 12 extending over the blade and is normally biased by coil springs 14 (FIGS. 3 and 4) to a position in front of the saw blade. A conventional circular saw may be readily converted to this type of tool, as shown in FIGS. 1 to 4, hinging a face plate 10 in the plane of the saw blade 16, at 18 in front of the saw blade and at 20 to the rear thereof. The rear hinge may be adjustably raised or lowered about a pivoted support 22 at the front hinge 18 by means of slotted arm 24 being adjustably clamped to the frame 26 of the saw housing by the clamp nut 28 at any desired elevation of the face plate 10, so as to adjust the depth of the saw cut in the strip 30 which is to be cut.

This saw may be provided with a handle 32, fixed to the motor casing 34 and having a finger switch 36. A base plate 38 may be attached to the bottom of the handle, motor and saw casing, so that the saw may be fixed to a wood surface or bench on the job close to the work at hand, by base screws 40. Thus a portable bench saw as well as hand saw is provided by alternate use of the same tool, as may be desired.

The square bracket 12 has a pair of ears 42 cut out of its base portions 44 which extend through the axially extending slots 46 in the face plate into substantially circular sectioned guide grooves 48. Coil springs 14 are mounted in these grooves and extend around the guide rods 52 fixed to the ears 42, providing the resilient bias to normally position the square bracket in front of the saw blade so as to guide the work strip squarely to the saw blade, as the work is moved on the face plate and pushes the bracket back against the spring bias until the cut through the strip is completed. Guide ridges 45 work slidably in slots 46 to hold the bracket 12 square with the saw.

In this adaptation of a conventional circular saw, the motor being at one side of the saw blade, permits tilting of the face plate 10 only to the other side from its normal position with respect to the blade. A rearrangement of the motor and the drive gear is desirable in order to permit tilting in both directions from the normal position. This would involve merely a matter of design.

In the conventional sabre saw, the saw blade 54 extends substantially in the plane of the motor axis, as may be seen in FIGS. 5 to 7. Thus, the face plate 10', in this case, may be hinged in the plane of the saw blade above the motor 56, as at 58 and may be tilted readily to more than 45° in either direction from the normal.

A spring pressed catch arm 60 pivotally mounted on the face plate 10' and having sector notches 62 annularly spaced and cooperating with a fixed plate 70 to position the face plate 10' selectively at desired angular tilts in either direction from the normal, may be provided with an operating lever 64, whereby arm 60 may be lifted off the ridge 70, and the face plate turned on its hinge to the desired tilt before releasing arm 60 with the corresponding notch over the ridge 70 (see FIG. 8).

The square bracket 12' in this case may have its base portions 66 on opposite sides of the saw blade interconnected back of the saw by the strip 68. The base portions may have rolled substantially circular sectioned guide ridges 42' slidably mounted in the guide grooves 48'. Coil springs 14' are biased against the rear end of these guide ridges to provide the resilient bias to said square bracket 12'.

A handle 72 having a finger switch 74 may be fixed to the motor casing, as shown, and a base plate 76 may be fixed to the bottom of the handle and motor frame and provided with mounting screw holes for screws 78, as in the other form illustrated, for mounting the tool in fixed position on a wooden base or bench at or close to the work station, when it is desired to use it as a bench saw. Obviously, care should be exercised in using the sabre saw to feed the work slowly and to hold it firmly against the square bracket, in order to prevent the work from jumping off the face plate with each outward stroke of the saw.

While only two specific forms of the invention are here illustrated, it is to be understood that obvious other modifications in the specific form and arrangement of parts may be made without departing from the spirit and scope of this application, as defined in the appended claims.

What is claimed is:

1. An inverted portable electric saw having a saw frame, a saw blade extending upwardly therefrom, a face plate on top of said saw frame and hinged to the saw frame in the plane of the saw blade, said face plate having a slot in it at the hinge line through which said saw blade projects, a square bracket slidably mounted in said face plate and extending inversely of, and to both sides of, the saw blade and having a relief opening enabling it to pass over said saw blade, for guiding a strip held against and pushing it over said face plate into the saw to make a cut through said strip perpendicular to its leading edge, and means in said face plate for normally resiliently biasing said square bracket into a position in front of said saw blade.

2. A portable saw as defined in claim 1, and means for adjusting the face plate angularly on said hinge in accordance with the desired angle of the cut through said strip.

3. A portable saw as defined in claim 2, and means for adjusting the face plate vertically in accordance with the depth of cut desired.

4. A portable saw as defined in claim 2, and a base plate fixed to the bottom of said handle and saw frame adapted for mounting the saw on a flat support for use as a bench saw.

5. A portable saw as defined in claim 1, said resiliently biasing means in said face plate comprising a coil spring under said face plate on each side of said saw blade, the rear end of each spring being abutted against the rear end of a guide groove and the front end of each spring being biased against a portion of said plate extending into said groove through a slot in said face plate over said groove.

6. A portable saw as defined in claim 2, said adjusting means comprising an annularly notched semicircular member diametrically hinged to said face plate on a lateral axis through the axis of the face plate hinge on said frame, a lug on said frame cooperating with the notches in said semicircular member, and means biasing said member against said lug.

7. A portable saw as defined in claim 6, and a lever fixed to said semicircular member and extending above said face plate for releasing said face plate during adjustment of said face plate with respect to said saw frame to bring a desired notch to lock over said lug in accordance with the angular saw tilt required.

8. A portable saw as defined in claim 5, said portions of said plate comprising parallel guide lugs slidably mounted in said guide grooves, to maintain said square in a plane perpendicular to said plate and said saw blade.

9. A portable saw as defined in claim 8, said guide lugs extending for a distance into the front end of said coil springs.

References Cited in the file of this patent

UNITED STATES PATENTS

| 2,673,582 | Thomas et al. | Mar. 30, 1954 |
| 2,696,854 | Woodruff | Dec. 14, 1954 |
| 2,704,092 | Green | Mar. 15, 1955 |
| 2,759,507 | Davis et al. | Aug. 21, 1956 |
| 2,881,812 | Alumbaugh et al. | Apr. 14, 1959 |
| 2,895,515 | Ende | July 21, 1959 |
| 3,060,979 | Hanvin | Oct. 30, 1962 |

FOREIGN PATENTS

| 241,050 | Switzerland | Jan. 1, 1946 |
| 624,299 | Great Britain | June 1, 1949 |